2,870,214

Patented Jan. 20, 1959

2,870,214

PREPARATION OF ALDEHYDES FROM DIOLS BY A DEHYDRATION REARRANGEMENT REACTION

Milton A. Perry and Ralph E. De Busk, Kingsport, Tenn., assignors to Eastman Kodak Company, Rochester, N. Y., a corporation of New Jersey No Drawing. Application May 17, 1957
Serial No. 659,750

8 Claims. (Cl. 260—603)

This invention relates to the preparation of saturated aliphatic aldehydes containing five or more carbon atoms, which are valuable intermediates in the manufacture of long-chained fatty acids that find utility as paint dryers, as plasticizer intermediates and as synthetic lubricant intermediates.

Esters of long-chained fatty alcohols and various dicarboxylic acids are known to be excellent plasticizers for synthetic resins. However, conventional methods have not proven satisfactory for commercial production of many of the desired esters. For example, we have found that though di-2,3,4-trimethylpentyl adipate and phthalate are much superior to any commercial plasticizer presently known for vinyl type of resins, and lead, cobalt and manganese salts of 2,3,4-trimethylpentanoic acid not only are equally efficacious but show improved solubilities in paint vehicles and, therefore, are superior to the salts of octanoic acids presently used in this kind of application, yet no satisfactory method was known heretofore for preparing the intermediate aldehydes from which the above-desired products may be obtained.

It is, accordingly, an object of our invention to provide saturated aliphatic aldehydes containing five or more carbon atoms by a novel process. Another object is to provide useful products derived therefrom. Other objects will become apparent from a reading of the description and examples.

In accordance with the invention, we prepare saturated aliphatic aldehydes containing five or more carbon atoms by heating 2,2-dialkyl-1,3-diols in the presence of acidic dehydration catalysts whereby one mole of water is split off per mole of the diol and rearrangement takes place smoothly to give aldehydes having the same number of carbon atoms, being saturated in character. Advantageously the reaction may be carried out with the diol dissolved in a suitable inert solvent, for example, hydrocarbons such as benzene, toluene, a low boiling petroleum hydrocarbon, etc. The reaction may be illustrated by the following equation:

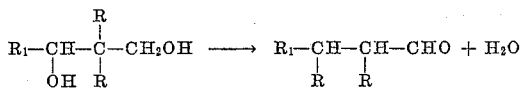

wherein each R represents the same or different alkyl groups of 1 to 4 carbon atoms, e. g. methyl, ethyl, propyl, isopropyl, butyl, etc. groups, and $R_1$ represents an atom of hydrogen or an alkyl group of 1 to 4 carbon atoms. The above result involving rearrangement is quite unexpected, because no instance is known heretofore of the rearrangement of 2,2-dialkyl-1,3-diols where aldehydes were obtained as products. The relative ease of migration of the alkyl groups in the 2-position originally will determine the nature of the rearranged products obtained. Our experience has shown that the less bulky alkyl groups have the most tendency to migrate. Thus, 2-ethyl-2-methyl-1,3-diols result in a predominance of the product obtained by migration of the methyl group. Where $R_1$ is hydrogen as in 2,2-dialkylpropane-1,3-diols, the dehydration-isomerization proceeds with difficulty since both OH functions are primary. Tetramethyltetrahydrofuran is obtained as a byproduct.

Suitable intermediate 2,2-dialkyl-1,3-diols for practicing our invention include 2,2-dialkyl-1,3-pentanediols such as 2,2-dimethylpropane-diol-1,3, 2-methyl-2-ethylpropanediol-1,3, 2-methyl-2-propylpropanediol-1,3, 2-methyl-2-isopropylpropanediol-1,3, 2-methyl-2-butylpropanediol-1,3, 2,2-diethylpropanediol-1,3, 2,2-dipropylpropanediol-1,3, 2,2-diisopropylpropanediol-1,3, 2-ethyl-2-butylpropanediol-1,3, 2,2-dibutylpropanediol-1,3, etc., 2,2-dialkyl-1,3-butanediols such as 2,2-dimethylbutanediol-1,3, etc., 2,2-dialkyl-1,3, pentanediols such as 2,2-dimethylpentanediol-1,3, 2,2,4-trimethylpentanediol-1,3, etc., 2,2-dialkyl-1,3-hexanediols such as 2,2,5-trimethylhexanediol-1,3, and the like. The preferred species is 2,2,4-trimethylpentanediol-1,3 for practicing the process of the invention.

The preferred method is to mix the 2,2-dialkyl-1,3,-diol with a suitable inert solvent in such proportions that the mixture is a mobile liquid. The proportions may be varied from about 10–70 parts by weight of the diol to from 90–30 parts by weight of the solvent. We have found it advantageous to use tetramethyltetrahydrofuran as a solvent, since this amounts to recycling this byproduct and thereby inhibiting this side reaction. The dehydration catalyst is best prepared by impregnating a carrier such as silica, alumina, glassbeads, etc. with a relatively nonvolatile acidic material such as a trialkyl phosphate wherein the alkyl groups contain from 1 to 4 carbon atoms, e. g. triethyl phosphate, tributyl phosphate, etc., an inorganic acid, e. g. sulfuric acid, phosphoric acid, etc., and baking at 450° C. until dry. The catalyst is placed in a reactor tube, preferably stainless steel, and heated to reaction temperature. The optimum temperature range is governed to some extent by the nature of the particular 2,2-dialkyl-1,3-diol used, but generally satisfactory temperatures lie in the range of from 100° to 500° C. The preferred range is from 135° to 300° C. If desired the reaction may be carried out at higher than atmospheric pressure. The mixture is fed over the catalyst bed at variable rates depending on each diol's own optimum contact time, for example, in the case of 2,2,4-trimethyl-1,3-pentanediol we prefer to feed a mixture of 300 g. of the diol in 500 g. of tetramethyltetrahydrofuran at a feed rate of 5–20 cc./min. into a preheater 24" long and 1" inside diameter, thence through a reactor having a catalyst bed of 60 cc. volume and collecting the effluent through a series of condensers. This effluent is then azeotroped with water to separate the products from leached out acids, unreacted diol, and any high boiling products that might be obtained. The organic material obtained as an azeotrope is then fractionated, for example, on a 100-plate column to separate the product, 2,3,4-trimethylpentanal, and tetramethyltetrahydrofuran. The base of the azeotrope column is sludged out and unreacted diol along with some acetal formed from 2,3,4-trimethylpentanal and the diol is recovered. This aldehyde can be reduced to the corresponding alcohol, oxidized to the corresponding acid, or transformed in any way normal to aldehydes.

The following examples will serve to illustrate further the manner whereby we practice our invention.

*Example 1*

A mixture of 450 g. of 2,2,4-trimethyl-1,3-pentanediol in 900 g. of benzene was passed over a catalyst bed comprising fine glass beads impregnated with triethyl phosphate, at a temperature of 250° C. with a space velocity of 0.404 volume changes per second. The effluent was azeotroped with water and the organic layer from this azeotrope was dry-distilled to give an 87.5% conversion of the diol to products. The yield of the desired aldehyde, 2,3,4-trimethylpentanal, B. P. 159° C./740 mm., was 52.3%, while the yield of the byproduct 2,2,4,4-tetramethyltetrahydrofuran, B. P. 121° C./740 mm., was 31.0%.

*Example 2*

A mixture of 300 g. of 2,2,4-trimethyl-1,3-pentanediol in 500 g. of 2,2,4,4-tetramethyltetrahydrofuran was passed over a catalyst bed comprising silica impregnated with ortho-phosphoric acid, at a temperature of 150° C., at a space velocity of 0.20% volumes per second. The effluent was treated in the same manner as in Example 1, the yield of 2,3,4-trimethylpentanal being 50.0%, based on the amount of the diol used, and the yield of the byproduct, 2,2,4,4-tetramethyltetrahydrofuran, being about 7.3%.

*Example 3*

A mixture of 450 g. of 2,2-dimethylpropane-1,3-diol in 900 cc. of benzene was passed over silica impregnated with ortho-phosphoric acid, 150° C. The effluent was treated as in Example 1 for the recovery of the products. From this reaction, a 15% conversion to the desired product, 2-methylbutyraldehyde was obtained with recovery of about 84% of the starting diol as unreacted material.

*Example 4*

A mixture of 300 g. of 2-methyl-2-ethylpropanediol-1,3 in 700 g. of benzene was passed over a catalyst bed comprising alumina impregnated with a mixture of triethyl phosphate and ortho-phosphoric acid, at 200° C., with a space velocity of 0.335 volume per second. The effluent and products on treatment as in Example 1 gave a mixture of aldehydes from which were separated by fractional distillation the isomers 2-ethylbutyraldehyde and 2-methylvaleraldehyde in the proportions of 70 parts of the former to 30 parts of the latter. The yield in this reaction was about 40% converted to the aldehydes with the balance recovered as unreacted starting material.

*Example 5*

A mixture of 450 g. of 2,2,4-trimethyl-1,3-pentanediol in 900 g. of benzene was passed over a catalyst comprising silica impregnated with ortho-phosphoric acid, at 160° C., with a space velocity of 0.204 volume per second. The products were separated and the fractions other than aldehyde were recycled through the reactor with additional 2,2,4-trimethylpentane-1,3-diol. The effluent was azeotroped and then dry-distilled as in Example 1. The overall yield of 2,3,4-trimethylpentanal was 64% along with 15% of 2,2,4,4-tetramethyltetrahydrofuran.

*Example 6*

2,3,4-trimethylpentanal obtained by the process of Example 1 was oxidized with potassium permanganate to give the corresponding acid, 2,3,4-trimethylpentanoic acid, B. P. 222° C./640 mm. The constitution of this acid was confirmed by synthesis wherein methyl isopropyl ketone was condensed with isobutyl α-bromopropionate to give the intermediate 2,3,4-trimethyl-3-hydroxyvaleric acid isobutyl ester ("Reformatsky reaction"), which on dehydration with acetic anhydride to the corresponding unsaturated ester, followed by reduction of the latter and saponification, resulted in the identical acid, 2,3,4-trimethylpentanoic acid.

*Example 7*

2,3,4-trimethylpentanal obtained by the process of Example 1 was catalytically reduced over Raney nickel to 2,3,4-trimethylpentanol, B. P. 181–183° C./740 mm. This alcohol was transformed into its esters such as to the phthalate, sebacate and adipate esters.

*Example 8*

4 gram moles of adipic acid and 12 gram moles of 2,3,4-trimethylpentanol were refluxed for 46 hours. The crude ester obtained was neutralized, washed and then distilled. A yield of 1115 g. equivalent to an 80% of the pure ester, di(2,3,4-trimethylpentyl)adipate, was obtained. It had a boiling point of 125°–130° C. at a pressure of 0.03–0.05 mm. This ester showed excellent stability to heat and boiling water, and had a very low evaporation rate as compared to commercially known plasticizers. Vinyl resins plasticized therewith show good low temperature properties and excellent permanence. In addition, this ester showed excellent properties as a synthetic lubricant.

*Example 9*

In a manner similar to that employed in Example 8, the phthalate ester of 2,3,4-trimethylpentanol was prepared in 70% yield. The ester had a boiling point of 140°–154° C. at a pressure of 0.1–0.2 mm. This ester showed improved permanence, stability and low temperature properties compared with commercial dioctyl phthalate.

*Example 10*

The lead, cobalt and manganese salts of 2,3,4-trimethylpentanoic acid were prepared and tested as paint driers. Comparison of these salts showed them to be more soluble than salts of octanoic acids used at present in paint formulae and equally efficacious in the drying operation. These salts offer the advantage of ease of formulation resulting in more economical operation.

By proceeding as set forth in the above examples, other useful aldehydes and derivatives thereof may be prepared with any other of the mentioned starting 2,2-dialkyl-1,3-diols.

What we claim and desire to secure by Letters Patent of the United States is:

1. A process for preparing an aldehyde represented by the following general formula:

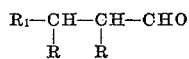

wherein each R represents an alkyl group containing from 1 to 4 carbon atoms and $R_1$ represents a member selected from the group consisting of an atom of hydrogen and an alkyl group containing from 1 to 4 carbon atoms, which comprises passing a 2,2-dialkyl-1,3-diol represented by the following formula:

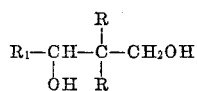

wherein R and $R_1$ are as above defined, over a dehydration catalyst selected from the group consisting of a phosphoric acid catalyst, a trialkyl phosphate catalyst wherein each alkyl group contains from 1 to 4 carbon atoms and a mixed catalyst of phosphoric acid and said trialkyl phosphate, at a temperature of from 100° to 500° C. and separating the said aldehyde from the effluent mixture.

2. The process of claim 1 wherein the effluent mixture, after separation of the said aldehyde, is recycled.

3. A process for preparing 2,3,4-trimethylpentanal which comprises passing a mixture of 2,2,4-trimethyl-1,3-pentanediol and 2,2,4,4-tetramethyltetrahydrofuran over a catalyst comprising a trialkyl phosphate wherein each alkyl group contains from 1 to 4 carbon atoms, at 135°–300° C., and separating the said 2,3,4-trimethylpentanal from the effluent mixture.

4. A process for preparing 2,3,4-trimethylpentanal which comprises passing a mixture of 2,2,4-trimethyl-1,3-pentanediol and 2,2,4,4-tetramethyltetrahydrofuran over a catalyst comprising ortho-phosphoric acid, at 135°–300° C., and separating the said 2,3,4-trimethylpentanal from the effluent mixture.

5. A process for preparing 2-methylbutyraldehyde which comprises passing a mixture of 2,2-dimethylpropane-1,3-diol and benzene over a catalyst comprising ortho-phosphoric acid, at 135°–300° C., and separating the said 2-methylbutyraldehyde from the effluent mixture.

6. A process for preparing 2-ethylbutyraldehyde which comprises passing a mixture of 2-methyl-2-ethylpropanediol-1,3 and benzene over a catalyst comprising triethyl phosphate and ortho-phosphoric acid, at 135°–300° C., and separating the said 2-ethylbutyraldehyde from the effluent mixture.

7. A process for preparing 2-methylvaleraldehyde which comprises passing a mixture of 2-methyl-2-ethylpropanediol-1,3 and benzene over a catalyst comprising triethyl phosphate and ortho-phosphoric acid, at 135°–300° C., and separating the said 2-methylvaleraldehyde from the effluent mixture.

8. A process for preparing 2,3,4-trimethylpentanal which comprises passing a mixture of 2,2,4-trimethyl-1,3-pentanediol and 2,2,4,4-tetramethyltetrahydrofuran over a catalyst comprising ortho-phosphoric acid, at 135°–300° C., separating the said 2,3,4-trimethylpentanal from the effluent mixture and recycling the residual effluent mixture.

References Cited in the file of this patent

UNITED STATES PATENTS 2,042,224   Groll et al. _____ May 26, 1936